US006962621B2

(12) United States Patent
Jung (10) Patent No.: US 6,962,621 B2
(45) Date of Patent: Nov. 8, 2005

(54) SYSTEM FOR SIMULTANEOUSLY REMOVING DUST AND VOLATILE TOXIC ORGANIC COMPOUNDS

(75) Inventor: Jae-Hak Jung, 1883-2, Daemyung-dong, Nam-gu, Daegu (KR)

(73) Assignees: Jae-Hak Jung, Daegu (KR); Tae Jin Lee, Daegu (KR); Suk Ho Kang, Daegu (KR)

( * ) Notice: Subject to any disclaimer, the term of this patent is extended or adjusted under 35 U.S.C. 154(b) by 68 days.

(21) Appl. No.: 10/620,414

(22) Filed: Jul. 17, 2003

(65) Prior Publication Data
US 2005/0011361 A1    Jan. 20, 2005

(51) Int. Cl.$^7$ .................... B01D 53/04; B01D 29/11; B01D 46/02
(52) U.S. Cl. .................... 96/132; 96/135; 96/136; 96/142; 96/143; 96/154; 55/318; 55/341.11; 55/467.1; 55/472
(58) Field of Search .................... 55/282.2, 282.5, 55/302, 315.2, 318, 341.11, 467.1, 472; 96/132–138, 96/142, 143, 146, 151, 154

(56) References Cited

U.S. PATENT DOCUMENTS

| | | | | |
|---|---|---|---|---|
| 2,146,071 A | * | 2/1939 | Horvath | |
| 3,224,169 A | * | 12/1965 | Gaylord, Jr. | |
| 3,261,147 A | * | 7/1966 | Allander | |
| 3,657,992 A | * | 4/1972 | Minnick, Jr. | 454/136 |
| 3,804,942 A | * | 4/1974 | Kato et al. | 423/239.1 |
| 3,812,370 A | * | 5/1974 | LaViolette | 422/186.12 |
| 4,599,095 A | * | 7/1986 | Barnes et al. | 96/146 |
| 4,701,195 A | * | 10/1987 | Rosendall | 96/136 |
| 4,737,173 A | * | 4/1988 | Kudirka et al. | 96/131 |
| 4,986,839 A | * | 1/1991 | Wertz et al. | 96/136 |
| 5,064,453 A | * | 11/1991 | Jacquish | 96/112 |
| 5,141,706 A | * | 8/1992 | Clark | 422/122 |
| 5,350,443 A | * | 9/1994 | von Blucher et al. | 96/135 |
| 5,827,355 A | * | 10/1998 | Wilson et al. | 95/114 |
| 5,873,919 A | * | 2/1999 | Vross et al. | 55/315.1 |
| 6,179,903 B1 | * | 1/2001 | Muller | 96/55 |
| 6,344,074 B1 | * | 2/2002 | Ward et al. | 96/399 |
| 6,432,177 B1 | * | 8/2002 | Dallas et al. | 96/132 |
| 6,464,760 B1 | * | 10/2002 | Sham et al. | 96/117.5 |
| 6,623,550 B2 | * | 9/2003 | Shah et al. | 96/134 |
| 6,680,028 B1 | * | 1/2004 | Harris | 422/122 |
| 2003/0029321 A1 | * | 2/2003 | Mishin et al. | 96/142 |
| 2004/0118285 A1 | * | 6/2004 | Kim et al. | 96/55 |
| 2004/0159239 A1 | * | 8/2004 | Nagem | 96/134 |

FOREIGN PATENT DOCUMENTS

GB        2238731 A    *    6/1991

* cited by examiner

*Primary Examiner*—Robert H. Spitzer
(74) *Attorney, Agent, or Firm*—Mayer, Brown, Rowe & Maw LLP (57) ABSTRACT

Disclosed herein is a system for simultaneously removing dust and volatile toxic organic compounds. The system comprises a dust collecting unit disposed between an inlet duct and an outlet duct for removing dust, an organic compound removing unit disposed between the inlet duct and the outlet duct for removing volatile toxic organic compounds, and an inlet blower disposed between the dust collecting unit and the organic compound removing unit. The dust collecting unit is made up of a bag filter, which comprises a housing formed in the shape of a box and connected to the inlet duct, a plurality of filtering members, such as cloth or felt, arranged in the housing, and dust collecting layers defined between the housing and the filtering members. The organic compound removing unit comprises an absorbing apparatus for absorbing the volatile toxic organic compounds, and regenerating heaters attached on the outer circumference of the absorbing apparatus.

10 Claims, 8 Drawing Sheets

SYSTEM FOR SIMULTANEOUSLY REMOVING DUST AND VOLATILE TOXIC ORGANIC COMPOUNDS

BACKGROUND OF THE INVENTION

1. Field of the Invention

The present invention relates to a system for simultaneously removing dust and volatile toxic organic compounds, and more particularly to a system for simultaneously removing dust and volatile toxic organic compounds, which is capable of efficiently removing dust and volatile toxic organic compounds produced in various industrial applications.

2. Description of the Related Art

As well known to those skilled in the art, the working environment is very poor in various industrial applications where dust and volatile toxic organic compounds are simultaneously produced, such as the casting industry, the coal-related industry, the grinding industry, the ship painting industry, the metal sheet rust removing industry, the surface treating industry for process industry related products, the metal mineral refining industry, incinerating plants, cement factories, etc. The result is that dust and volatile toxic organic compounds are not efficiently removed in the aforementioned industrial applications.

Workers usually wear masks to work in their workshops. However, it is actually impossible to simultaneously prevent the dust and the volatile toxic organic compounds from entering their bodies via their mouths merely using the masks, which are nothing but fibrous filters.

Consequently, the abovementioned industrial applications are generally regarded as the principal offences of air pollution, and therefore they are not free from various administrative interventions of public or private environment-related institutions, and are placed under legal restrictions according to the environmental protection laws, which are serious obstacles to business.

Furthermore, the workers injure their health or suffer from serious diseases because of the dust and the volatile toxic organic compounds, which have bad influences on the health of the workers. As a result, workers wish to keep out of the aforementioned industrial applications.

SUMMARY OF THE INVENTION

Therefore, the present invention has been made in view of the above problems, and it is an object of the present invention to provide a system for simultaneously removing dust and volatile toxic organic compounds which can be installed with appropriate capacity in any industrial application where dust and volatile toxic organic compounds are simultaneously produced, thereby greatly improving working environment, preventing air pollution to eliminate obstacles to business, and giving workers working conditions in which they work while enjoying good health.

It is another object of the present invention to provide a system for simultaneously removing dust and volatile toxic organic compounds which is capable of minimizing bad effects to an apparatus for removing volatile toxic organic compounds by dust and bad effects to an apparatus for removing dust by volatile toxic organic compounds when the apparatus for removing volatile toxic organic compounds and the apparatus for removing dust are individually operated, whereby the apparatus for removing volatile toxic organic compounds and the apparatus for removing dust can be operated with the maximum efficiency.

It is yet another object of the present invention to provide a system for simultaneously removing dust and volatile toxic organic compounds which can be equipped with various absorbing apparatuses, thereby carrying out a proper process of removal on the basis of applied sites and uses, and increasing efficiency of each of the absorbing apparatuses.

In accordance with one aspect of the present invention, the above and other objects can be accomplished by the provision of a system for simultaneously removing dust and volatile toxic organic compounds from contaminated air produced in a workshop, the system comprising: a dust collecting unit disposed between an inlet duct and an outlet duct for removing dust; an organic compound removing unit disposed between the inlet duct and the outlet duct for removing volatile toxic organic compounds; and an inlet blower disposed between the dust collecting unit and the organic compound removing unit, wherein the dust collecting unit is made up of a bag filter comprising: a housing formed in the shape of a box and connected to the inlet duct; a plurality of filtering members, such as cloth or felt, arranged in the housing; and dust collecting layers defined between the housing and the filtering members, and wherein the organic compound removing unit comprises: an absorbing apparatus for absorbing the volatile toxic organic compounds; and regenerating heaters attached on the outer circumference of the absorbing apparatus, whereby the dust and the volatile toxic organic compounds are removed when the contaminated air containing the dust and the volatile toxic organic compounds passes through the dust collecting unit and the organic compound removing unit.

In accordance with another aspect of the present invention, there is provided a system for simultaneously removing dust and volatile toxic organic compounds from contaminated air produced in a workshop, comprising: a dust collecting unit disposed between an inlet duct and an outlet duct for removing dust; an organic compound removing unit disposed between the inlet duct and the outlet duct for removing volatile toxic organic compounds; and an inlet blower disposed between the dust collecting unit and the organic compound removing unit, wherein the dust collecting unit is made up of a bag filter comprising: a housing formed in the shape of a box and connected to the inlet duct; a plurality of filtering members, such as cloth or felt, arranged in the housing; and dust collecting layers defined between the housing and the filtering members, wherein the organic compound removing unit comprises: an absorbing apparatus for absorbing the volatile toxic organic compounds; and regenerating heaters attached on the outer circumference of the absorbing apparatus, and wherein the system further comprises: a damper for changing the flow direction of the air to regenerate the absorbing apparatus; and a water tank connected to a bypass duct for storing the volatile toxic organic compounds, whereby the system separately performs a dust collecting and volatile organic compound removing process in which gas is introduced into the inlet duct, and passes through the bag filter, the absorbing apparatus, the outlet duct, and a discharging unit in order, and an absorbing apparatus regenerating process in which gas is introduced into the inlet duct, the gas introduced into the inlet duct passes through the bag filter, the gas having passed through the bag filter passed through the absorbing apparatus while the absorbing apparatus is heated by the regenerating heaters attached on the outer circumference of the absorbing apparatus, the gas having passed through the absorbing apparatus passes through the outlet duct, and the damper in order, and is then introduced into the water tank.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
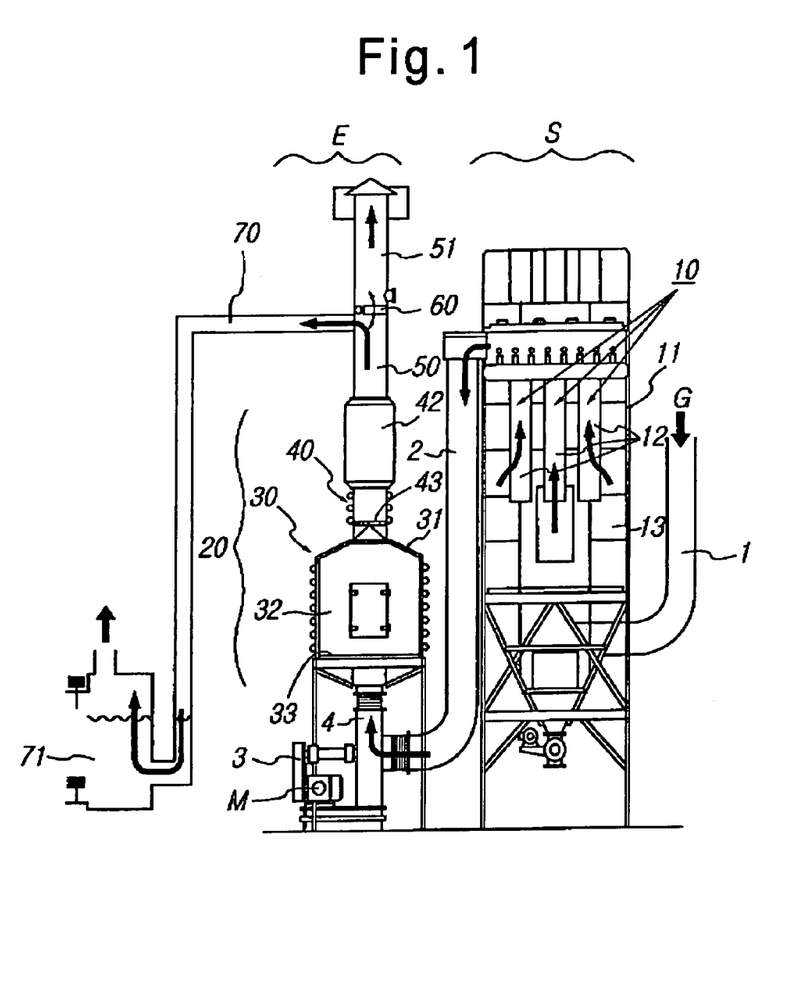
FIG. 1 is a layout diagram of a system for simultaneously removing dust and volatile toxic organic compounds according to a preferred embodiment of the present invention.
Figure 2:
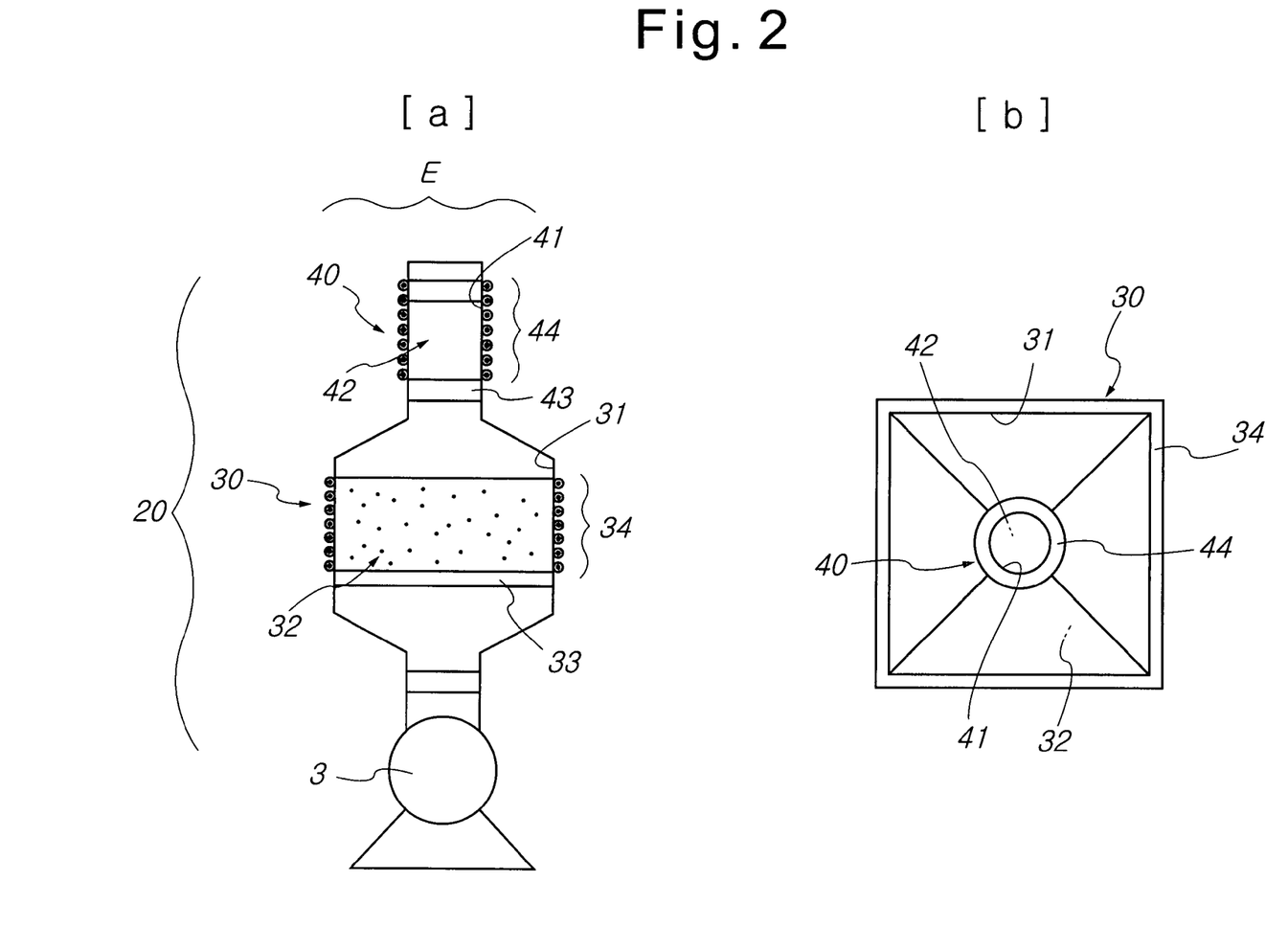
FIGS. 2a and 2b are a longitudinal sectional view and a plan views, respectively, showing regenerative heaters of the system for simultaneously removing dust and volatile toxic organic compounds according to the preferred embodiment of the present invention.
Figure 3:
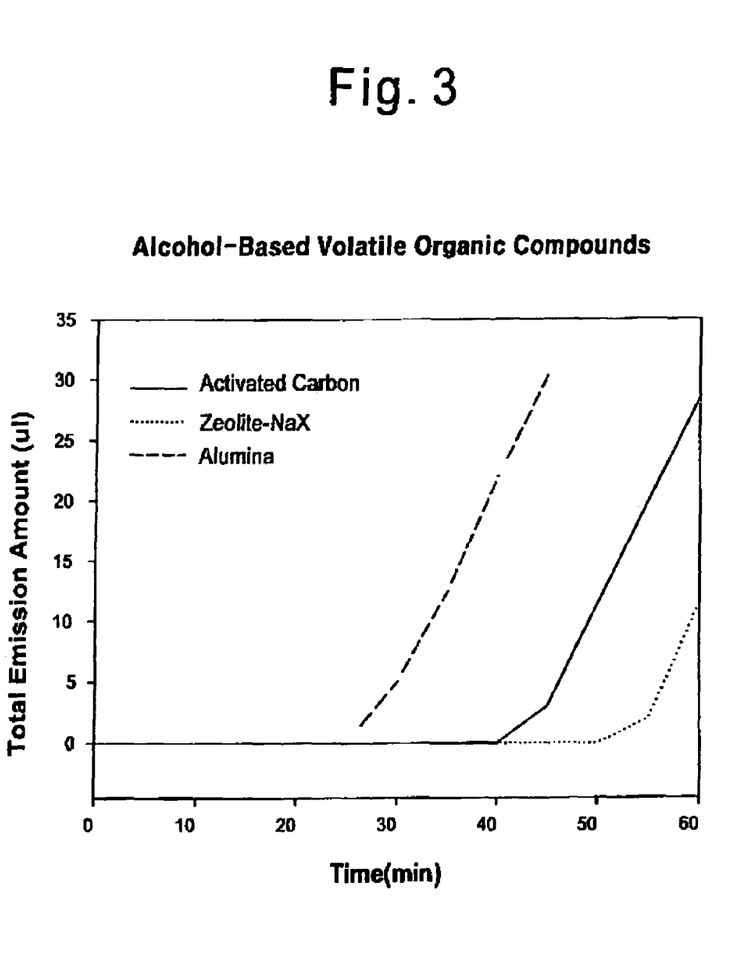
FIG. 3 is a graph illustrating total emission amounts of alcohol-based volatile organic compounds discharged through the whole absorbing layer on the basis of time in the system for simultaneously removing dust and volatile toxic organic compounds according to the preferred embodiment of the present invention.
Figure 4:
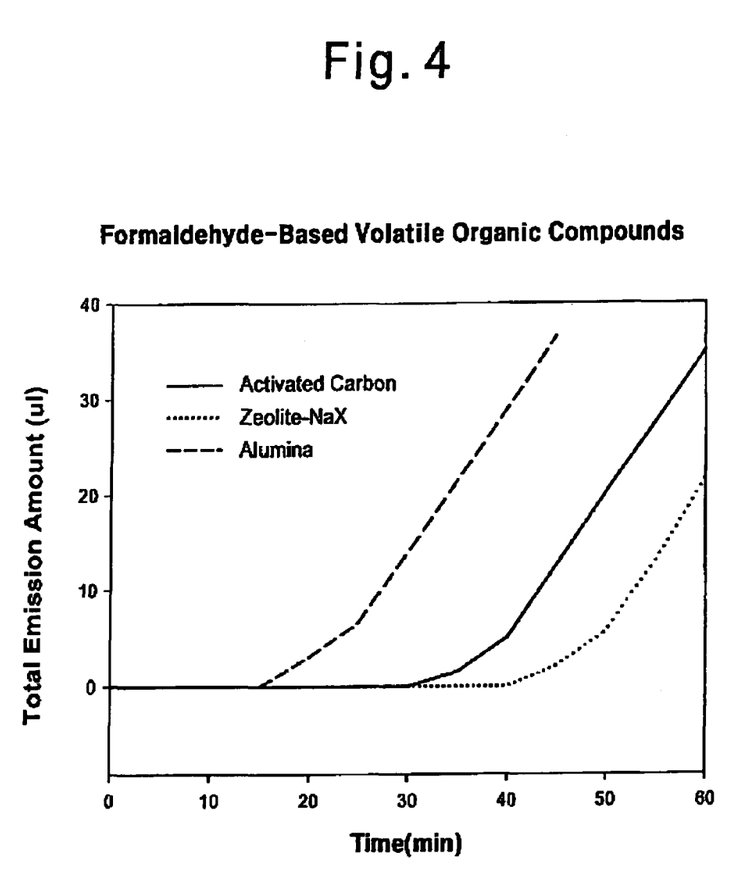
FIG. 4 is a graph illustrating total emission amounts of formaldehyde-based volatile organic compounds discharged through the whole absorbing layer on the basis of time in the system for simultaneously removing dust and volatile toxic organic compounds according to the preferred embodiment of the present invention.
Figure 5:
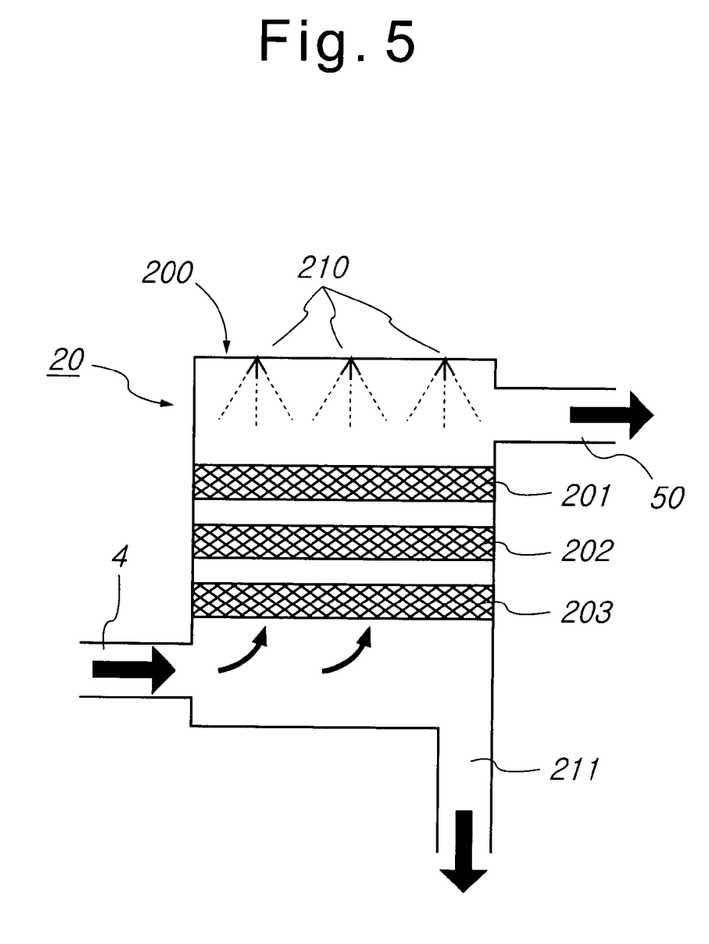
FIG. 5 is a cross-sectional view showing a wet absorbing apparatus applicable to the system for simultaneously removing dust and volatile toxic organic compounds according to the preferred embodiment of the present invention.
Figure 6:
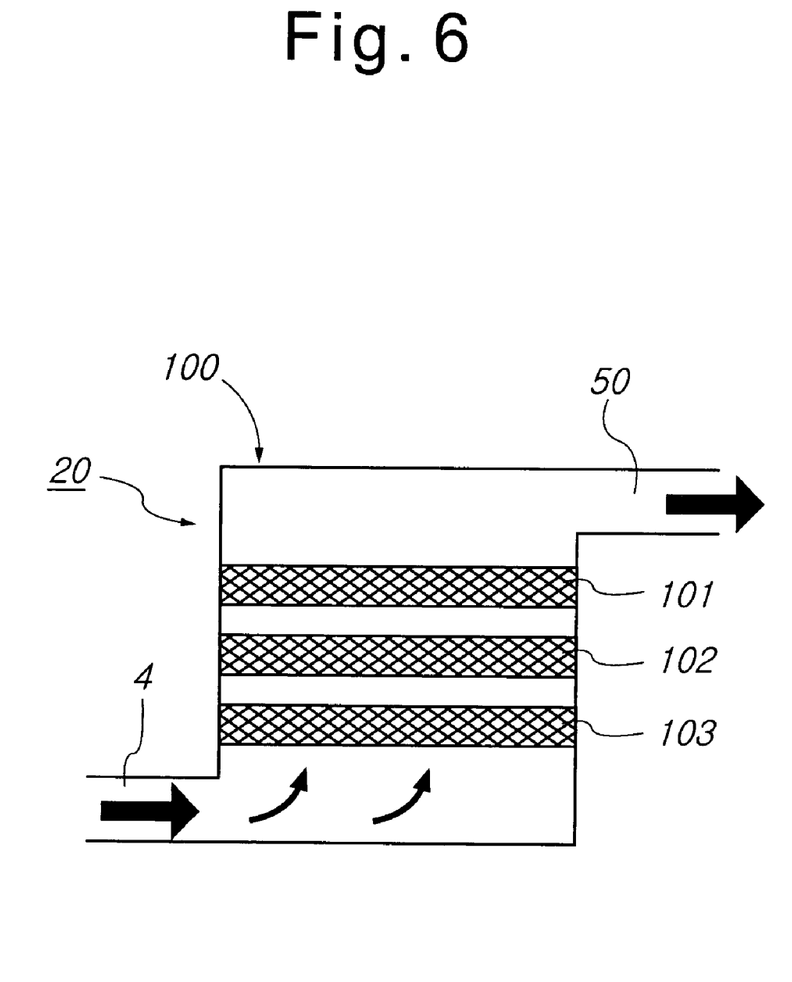
FIG. 6 is a cross-sectional view showing a dry absorbing apparatus applicable to the system for simultaneously removing dust and volatile toxic organic compounds according to the preferred embodiment of the present invention.
Figure 7:
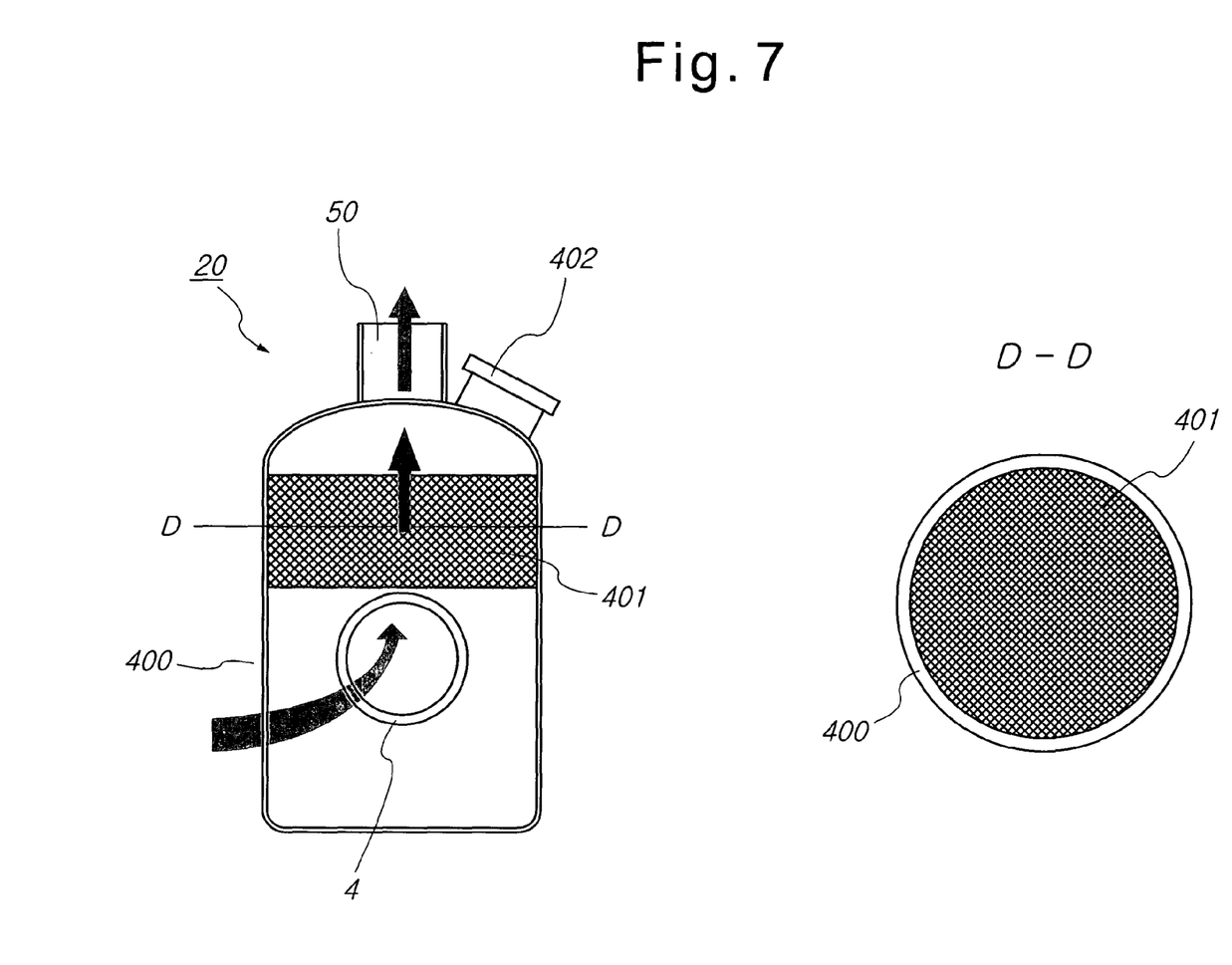
FIG. 7 is a cross-sectional view showing a small capacity absorbing apparatus applicable to the system for simultaneously removing dust and volatile toxic organic compounds according to the preferred embodiment of the present invention.
Figure 8:
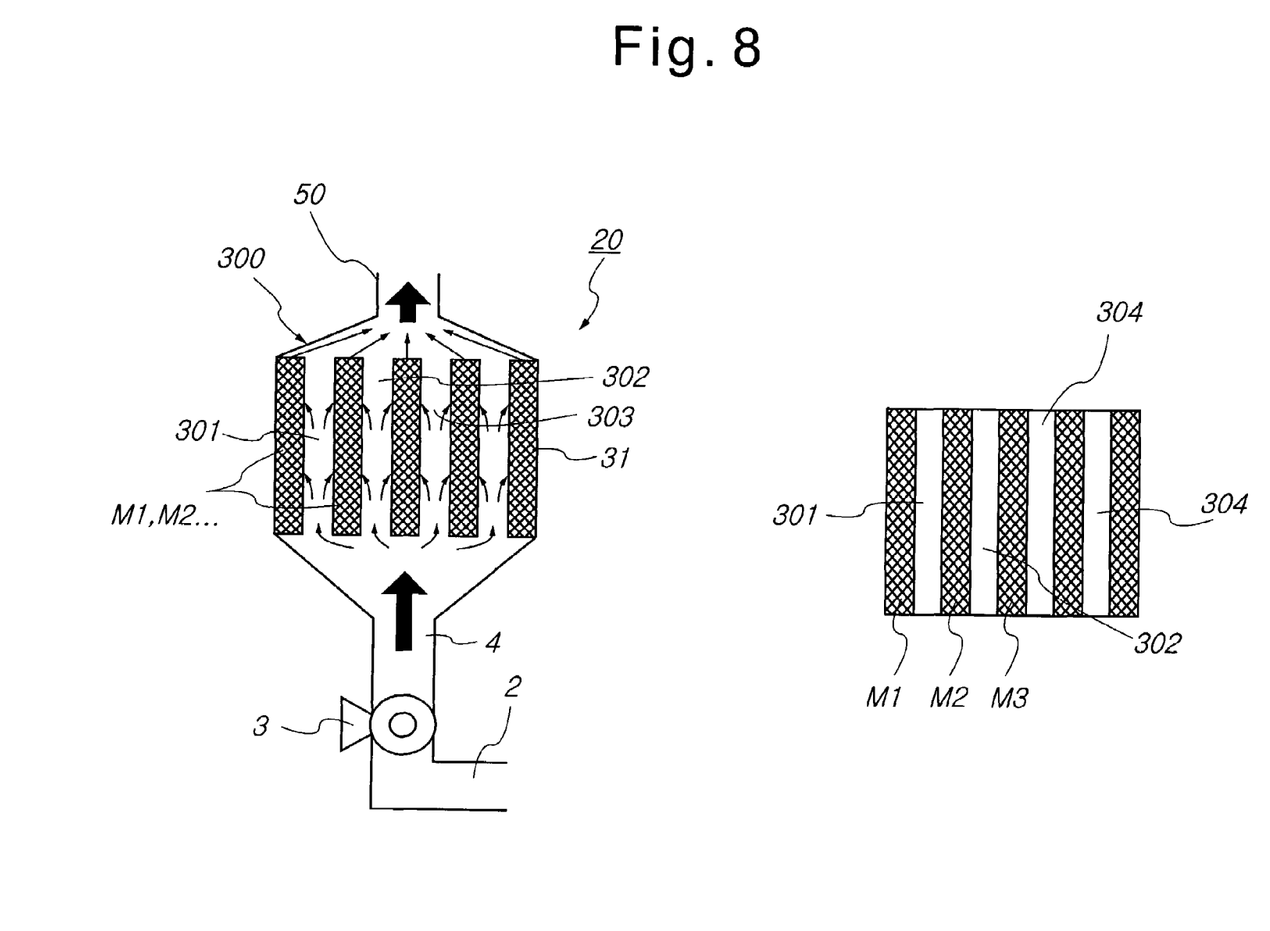
FIG. 8 is a cross-sectional view showing a large capacity absorbing apparatus applicable to the system for simultaneously removing dust and volatile toxic organic compounds according to the preferred embodiment of the present invention.

Now, a system for simultaneously removing dust and volatile toxic organic compounds of the present invention will be described in detail with reference to the accompanying drawings. FIG. 1 is a layout diagram of a system for simultaneously removing dust and volatile toxic organic compounds according to a preferred embodiment of the present invention, FIGS. 2a and 2b are a longitudinal sectional view and a plan view, respectively, showing regenerative heaters of the system for simultaneously removing dust and volatile toxic organic compounds according to the preferred embodiment of the present invention, FIG. 3 is a graph illustrating total emission amounts of alcohol discharged through the whole absorbing layer on the basis of time in the system for simultaneously removing dust and volatile toxic organic compounds according to the preferred embodiment of the present invention, FIG. 4 is a graph illustrating total emission amounts of formaldehyde discharged through the whole absorbing layer on the basis of time in the system for simultaneously removing dust and volatile toxic organic compounds according to the preferred embodiment of the present invention, FIG. 5 is a cross-sectional view showing a wet absorbing apparatus applicable to the system for simultaneously removing dust and volatile toxic organic compounds according to the preferred embodiment of the present invention, FIG. 6 is a cross-sectional view showing a dry absorbing apparatus applicable to the system for simultaneously removing dust and volatile toxic organic compounds according to the preferred embodiment of the present invention, FIG. 7 is a cross-sectional view showing a small capacity absorbing apparatus applicable to the system for simultaneously removing dust and volatile toxic organic compounds according to the preferred embodiment of the present invention, and FIG. 8 is a cross-sectional view showing a large capacity absorbing apparatus applicable to the system for simultaneously removing dust and volatile toxic organic compounds according to the preferred embodiment of the present invention The construction and the operation of the system for simultaneously removing dust and volatile toxic organic compounds of the present invention will be described with reference to FIG. 1.

The system for simultaneously removing dust and volatile toxic organic compounds of the present invention generally comprises: a dust collecting unit S for removing dust; and an organic compound removing unit E for removing volatile toxic organic compounds.

The construction of the dust collecting unit S for removing the dust is as follows:

Gas G, which is a mixture of dust and volatile toxic organic compounds produced in various industrial applications, is introduced into a bag filter 10 of a well-known structure through an inlet duct 1.

The bag filter 10 is an equipment usually used in environment-related industries, which is capable of economically and efficiently separating dust particles from the gas. The bag filter 10 comprises: an upright housing 11 formed in the shape of a box and connected to the inlet duct 1; and a plurality of filtering members 12, such as cloth or felt, arranged in the upright housing 11. Between the upright housing 11 and the filtering members 12 are defined dust collecting layers 13.

Dust contained in the gas G introduced from the inlet duct 1 by means of an inlet blower 3, which will be described later, is initially filtered by only the filtering members 12. As time goes by, however, dust layers are formed on the filtering members 12, respectively. Consequently, the dust layers formed on the filtering members 12 serve as supporting members with the result that an additional filtering process may be carried out by means of the dust layers. It is known that the aforesaid bag filter has a dust filtering and collecting efficiency of not less than 99%.

Filtering cloth, which constitutes each of the filtering members 12, collects only some of dust. However, the dust layers rapidly formed on the filtering members 12 serve as the supporting members for collecting the dust. Consequently, the dust layers efficiently collect fine dust and dust with high concentration. The collected dust is discharged by means of various mechanical apparatuses.

Since each of the filtering members of the bag filter 10 is made of cloth or felt, the bag filter 10 collects the dust using gaps defined in the cloth or the felt. After the bag filter 10 is used for a long time, however, the gaps defined in the cloth or the felt are closed, which decreases the collecting efficiency of the bag filter 10.

In the bag filter 10 of the present invention, the filtering members 12 made of cotton, non-woven fabric, etc. are coated with Gore-Tex, polyester, or polypropylene, which increases the service life of the cotton or the non-woven fabric, and thus increases the dust collecting efficiency of the filtering members 12.

The dust introduced into the bag filter 10 through the inlet duct 1 closes the gaps formed in the filtering members 12. The dust closing the gaps is not easily separated from the filtering members 12 when the dust is removed from the filtering members 12. Coating the filtering members 12 with the Gore-Tex, polyester, or polypropylene eliminates the aforesaid drawback.

While the gas G passes through the bag filter 10, most of the dust contained in the gas G is removed. Subsequently, the gas G is introduced from the upper part of the bag filter 10 to the lower part of an absorbing apparatus 20 of the organic compound removing unit E via a guide duct 2.

Preferably, the gas G is supplied to the absorbing apparatus 20 via the guide duct 2 by means of the inlet blower 3, which is operated by a motor M.

The gas G, from which the dust is firstly removed as mentioned above, is introduced into the organic compound removing unit E, which is constructed in an upright structure.

As shown in FIG. 1, the organic compound removing unit E comprises the absorbing apparatus 20. The gas G guided along the guide duct 2, the dust of which is already removed, is upwardly supplied along a supply duct 4. The gas G supplied along the supply duct 4 is rapidly blown into the absorbing apparatus 20 by means of the inlet blower 3.

Preferably, the absorbing apparatus 20 comprises: a first absorber 30 having activated carbon 32 put therein; and a second absorber 40 having zeolite 42 put therein, although the absorbing apparatus 20 may have other different constructions depending upon use, installation site, and capacity of the absorbing apparatus 20.

The reason why the absorbing apparatus 20 comprises the first absorber 30 and the second absorber 40, and the activated carbon 32 and the zeolite 42 are put in the first absorber 30 and the second absorber 40, respectively, is that absorbents for absorbing various volatile toxic organic compounds are different from each other, and thus the absorbents must be disposed in the gas flowing channel.

As shown in FIG. 1, the first absorber 30 comprises: a case 31 made of a corrosion-resisting metal and formed in the shape of a box; and a supporting mesh 33 for supporting the activated carbon 32. The supporting mesh 33 is made of a corrosion-resisting metal. The activated carbon 32 is put on the supporting mesh 33 in such a manner that it is supported by the supporting mesh 33.

On the first absorber 30 is disposed the second absorber 40, which comprises: a case 41 formed in the shape of a cylinder and having a cross sectional area smaller than that of the case 31 of the first absorber 30; and a supporting mesh 43 for supporting the zeolite 42. The zeolite 42 is put on the supporting mesh 43 in such a manner that it is supported by the supporting mesh 43.

On the outer circumferences of the first absorber 30 and the second absorber 40 are attached regenerating heaters 34 and 44, respectively, in such a manner that various insulators (not shown) are interposed between the first absorber 30 and the regenerating heater 34 and between the second absorber 40 and the regenerating heater 44. The regenerating heaters 34 and 44 may be made up of electric heating tubes, steam tubes, heating plates, or heating sheets. When an electric current is applied to the regenerating heaters 34 and 44, the regenerating heaters 34 and 44 heat the first absorber 30 and the second absorber 40, respectively.

When the regenerating heaters 34 and 44, which are attached on the circumferences of the first absorber 30 and the second absorber 40, respectively, heat the first absorber 30 and the second absorber 40, respectively, the activated carbon 32 put in the first absorber 30 and the zeolite 42 put in the second absorber 40 are heated. When the activated carbon 32 and the zeolite 42 are heated, the absorption efficiencies of the activated carbon 32 and the zeolite 42 are regenerated.

The reason why the cross sectional area of the first absorber 30 is smaller than that of the second absorber 40 is that the zeolite 42 is more expensive and heavier than the activated carbon 32 although the zeolite 42 is superior to the activated carbon in terms of the absorbing efficiency. Consequently, the absorbing apparatus 20 is constructed in such a manner that the cross sectional area of the first absorber 30 is smaller than that of the second absorber 40, in order to guarantee economical efficiency and structural stability. The aforementioned construction of the absorbing apparatus 20 has no influence upon the performance of the absorbing apparatus 20.

The absorbing efficiencies of the activated carbon 32 and the zeolite 42 vary upon whether the volatile toxic organic compounds are alcohol-based volatile organic compounds as shown in FIG. 3 or formaldehyde-based volatile organic compounds as shown in FIG. 4. Consequently, it is required that the activated carbon 32 and the zeolite 42 be properly combined with each other.

An absorbing tube made of glass is filled with 1G of an absorbent. Gas collected at a factory (in the experiment examples, air around a worker working at Keuk-Dong Metal Industry Co., Ltd., which is a company manufacturing cast-iron products) is introduced into the absorbing tube at a speed of 200 ml/min, and then alcohol-based volatile organic compounds and formaldehyde-based volatile organic compounds are detected every 5 minutes using an on-line gas chromatograph, respectively. The detection results of the alcohol-based volatile organic compounds and the formaldehyde-based volatile organic compounds are illustrated in FIGS. 3 and 4, respectively. The amount of contaminated air containing the volatile toxic organic compounds absorbed by one gram of the absorbent can be calculated using the following equations (1) and (2).

It may be noted that the service life of the absorbent expires from when numerical value more than "0" appears in FIGS. 3 and 4.

Emission amount ($\mu$ll)=5 min*200 ml/min* concentration of alcohol*1,000 $\mu$l1/ml  Equation (1):

Total emission amount=Sum of Emission amount  Equation (2):

The actual amount or the actual efficiency of absorbing the contaminated air containing the volatile toxic organic compounds by units of one gram of the absorbent can be calculated by multiplication of the flow rate of the introduced air (200 ml/min) and time before the alcohol-based volatile organic compounds or the formaldehyde-based volatile organic compounds are initially detected.

The efficiency of absorbing the formaldehyde-based volatile organic compounds by units of one gram of absorbent is as follows: 3,000 ml/min for alumina; 6,000 ml/min for activated carbon; 8,000 ml/min for zeolite-nax.

The amount of the absorbent is determined considering the efficiency of the absorbent and environment of the workshop (installation space, the size of the system, etc.), and it is calculated from the aforesaid data when the determined amount of the absorbent is completely contaminated after the system is operated, in order to determine regeneration period of the absorbent. Alternatively, the amount of the absorbent may be determined after the regeneration period of the absorbent is previously chosen (for example, every month or 4 times a year).

To the absorbing apparatus 20, which is made up of the first absorber 30 and the second absorber 40, is fluidly connected an outlet duct 50. In the middle of the outlet duct 50 is disposed a damper 60 for changing the flow direction of the air to regenerate the absorbent, which will be described later. The damper 60 is a common bypass filter, which is a remotely and electrically controlled switching door.

The part of the outlet duct 50 arranged in the rear of the damper 60 is formed integrally to a discharging unit 51, which communicates with the outer air.

To the damper 60 is connected a bypass duct 70, which is also connected to a lower part of a water tank 71 for storing the volatile toxic organic compounds. Consequently, the air containing the volatile toxic organic compounds is discharged from the water tank 71.

The system for simultaneously removing dust and volatile toxic organic compounds with the above-stated construction of the present invention performs the following dust collecting and volatile organic compound removing process.

The gas G is introduced into the inlet duct 1, and passes through the bag filter 10, the guide duct 2, the inlet blower 3, the first absorber 30, the second absorber 40, the outlet duct 50, and the discharging unit 51 in order, with the result that the dust and the volatile toxic organic compounds are removed from the gas G. Subsequently, the purified gas is discharged into the outer air.

After the above-mentioned process of removing the dust and the volatile toxic organic compounds from the gas G is repeatedly carried out, it is required to periodically carry out a process for regenerating the absorbents, for example, the activated carbon and the zeolite, as follows:

The damper 60 is operated in the outlet duct 50 to carry out the process for regenerating the absorbents.

The clean air is introduced into the inlet duct 1, passes through the bag filter 10, the guide duct 2, the inlet blower 3, the first absorber 30, the second absorber 40, the outlet duct 50, and the damper 60 in order, and then introduced into the water tank 71.

While carrying out the process for regenerating the absorbents as mentioned above, the regenerating heaters 34 and 44 attached on the outer circumferences of the first absorber 30 and the second absorber 40, respectively, heat the first absorber 30 and the second absorber 40 so that the activated carbon put in the first absorber 30 and the zeolite put in the second absorber 40 are heated to a temperature of 120–150° C.

When the temperature of the absorbents is over approximately 100° C. by heating of the regenerating heaters 34 and 44, the organic compounds are separated from the absorbents. The gas containing the organic compounds separated from the absorbents pass through the water in the water tank 71 with the result that the temperature of the gas is decreased and the organic compounds are solved in the water of the water tank 71.

The clean gas containing no organic compounds is discharged into the outer air. In this way, the process for regenerating the absorbents is completed, and thus the absorbents, such as activated carbon and zeolite, are considerably regenerated so that the absorbents may be used again for a predetermined period of time.

According to the above experiment, it is proven that the bag filter 10 of the dust collecting unit S is preferably designed as follows:

The bag filter 10 of the dust collecting unit S is designed to be a common pulse jet type, although the bag filter 10 of the dust collecting unit S is designed to be used in any other types.

The filtering speed of the bag filter 10 (flow rate of gas/cross sectional area of the bag filter) is 2 to 5 m/min, the speed of a current in the inlet duct 1 is 10 m/sec or more, the speed of a current in the housing of the bag filter 10 is 60 m/min or less, the size of the bag filter is 100 to 300 mm in diameter, and the material of the filtering members 12 of the bag filter 10 is cotton or polyester. The filtering members 12 of the bag filter 10 are coated with Gore-Tex, polyester, or polypropylene. And the height of the bag filter 10 is preferably 3 to 8 times as long as the diameter of the bag filter 10.

The capacity of the inlet blower 3 is determined on the basis of the above-mentioned requirements and the amount of dust at the workshop where the system is used. The amount of removed dust every hour (kg/min) is derived from multiplication of capacity of the inlet blower 3 ($m^3$/min) and concentration of dust per volume (kg/$m^3$), from which the amount of removed dust every day can be obtained.

Consequently, the total cross sectional area of the bag filter 10, and the height and the cross sectional area of the housing 11 of the bag filter 10 are derived, from which the size of the dust collecting unit S is determined, and thus the number and the size of the bag filter 10 are determined.

The flow speed of air is determined on the basis of the capacity of the dust collecting unit S, the capacity of the inlet blower 3, and the diameters of the ducts, from which the amount of the organic compounds per volume in the air is obtained and the amount of total organic compounds every hour is also obtained.

The amounts of the zeolite and the activated carbon are easily obtained from the graphs of FIGS. 3 and 4. It should be noted, however, that a general requirement for design is determined according to the environment of the workshop and the desired degree of purification. Accordingly, numerical limitation to the components of the system according to the present invention falls into the scope of the present invention as long as the system of the present invention is constructed identically or similarly by the numerical limitation.

FIGS. 5 to 8 show various constructions of the absorbing apparatus 20, in which the activated carbon and the zeolite are put on the mesh, of the organic compound removing unit E, respectively. It should be noted that the regenerating heater may be attached to the outer circumference of the absorbing apparatus 20, although the regenerating heater is not shown in FIGS. 5 to 8.

FIG. 6 is a cross-sectional view of a dry absorbing apparatus applicable to the system for simultaneously removing dust and volatile toxic organic compounds according to the preferred embodiment of the present invention, schematically showing the dry absorbing apparatus 20 of the organic compound removing unit E.

As shown in FIG. 6, the dry absorbing apparatus 20 comprises: a housing 100 connected between the supply duct 4 and the outlet duct 50; and a plurality of absorbing layers 101, 102, and 103 disposed in the housing 100.

The absorbing layers 101, 102, and 103 are arranged in such a manner that the absorbing layers made of the activated carbon and the absorbing layers made of the zeolite are alternately stacked, or the absorbing layers 101, 102, and 103, all of which are made of mixtures of the activated carbon and the zeolite, are stacked. In other words, the absorbing layers 101 may be made of the activated carbon, the absorbing layers 102 may be made of the zeolite, and the absorbing layers 103 may be made of the activated carbon. Otherwise, all of the absorbing layers 101, 102, and 103 are made of mixtures of the activated carbon and the zeolite.

FIG. 5 is a cross-sectional view of a wet absorbing apparatus applicable to the system for simultaneously removing dust and volatile toxic organic compounds according to the preferred embodiment of the present invention, schematically showing the wet absorbing apparatus 20 of the organic compound removing unit E.

As shown in FIG. 5, the wet absorbing apparatus 20 comprises: a housing 200 connected between the supply duct 4 and the outlet duct 50; and a plurality of absorbing layers 201, 202, and 203 disposed in the housing 100. The absorbing layers 201, 202, and 203 may be constructed like the absorbing layers 101, 102, and 103 as shown in FIG. 6.

To the upper part of the housing 200 are attached a plurality of spray nozzles 210 for spraying water onto the absorbing layers 201, 202, and 203 disposed in the housing 100. To the lower part of the housing 200 is connected a drain duct 211 for draining the water.

Most of the volatile organic compounds are soluble in water. Accordingly, the above-mentioned wet absorbing apparatus 20 can remove the volatile organic compounds more efficiently.

FIG. 8 is a cross-sectional view of a large capacity absorbing apparatus applicable to the system for simultaneously removing dust and volatile toxic organic compounds according to the preferred embodiment of the present invention, schematically showing the large capacity absorbing apparatus 20 of the organic compound removing unit E. The large capacity absorbing apparatus 20 as shown in FIG. 8 is preferably installed to a large-scaled workshop where contaminated air is enormously discharged.

As shown in FIG. 8, the large capacity absorbing apparatus 20 comprises: a housing 300 connected between the supply duct 4 and the outlet duct 50; and a plurality of upright tubular absorbing layers M1, M2, M3, M4, and M5 disposed in the housing 300. Between the upright tubular absorbing layers M1, M2, M3, M4, and M5 are defined tubular absorbing channels 301, 302, 303, and 304. Consequently, contact area between the absorbent and contaminated air is increased.

In the large capacity absorbing apparatus 20, the absorbing layers M1, M2, M3, M4, and M5 are vertically disposed while being horizontally arranged in parallel with each other. This is because the absorbing layers may be broken due to their weights when the absorbing layers are horizontally disposed.

FIG. 7 is a cross-sectional view showing a small capacity absorbing apparatus applicable to the system for simultaneously removing dust and volatile toxic organic compounds according to the preferred embodiment of the present invention, schematically showing the small capacity absorbing apparatus 20 of the organic compound removing unit E. The small capacity absorbing apparatus 20 as shown in FIG. 7 is preferably installed to a small-scaled workshop where a small amount of contaminated air is discharged and thus a large-scaled facility is not required from an economical point of view.

As shown in FIG. 7, the small capacity absorbing apparatus 20 comprises: a housing 400 formed in the shape of a cylinder and detachably connected between the supply duct 4 and the outlet duct 50; and at least one absorbing layer 401 disposed in the housing 400. Preferably, the small capacity absorbing apparatus 20 is provided with an opening 402 for filling and cleaning the absorbent. The opening 402 may be formed in the shape of an open window.

As apparent from the above description, the present invention provides a system for simultaneously removing dust and volatile toxic organic compounds, which is capable of efficiently removing dust and volatile toxic organic compounds produced in various industrial applications, whereby working environment of workers is improved, a phenomenon of evading work in the industrial applications where dust and volatile toxic organic compounds are simultaneously produced is solved so that demand and supply of manpower is smoothly accomplished, working efficiency is increased, health of workers is promoted, and eventually environmentally-friendly industries minimizing environmental pollution are realized.

Furthermore, discharge of air pollution sources is decreased, and thus company's expenses necessary for protecting the environment are considerably reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for simultaneously removing dust and volatile toxic organic compounds from contaminated air produced in a workshop, the system comprising:

a dust collecting unit disposed between an inlet duct and an outlet duct for removing dust;

an organic compound removing unit disposed between the inlet duct and the outlet duct for removing volatile toxic organic compounds; and an inlet blower disposed between the dust collecting unit and the organic compound removing unit, wherein the dust collecting unit is made up of a bag filter comprising:

a housing formed in the shape of a box and connected to the inlet duct;

a plurality of filtering members arranged in the housing; and dust collecting layers defined between the housing and the filtering members, wherein the organic compound removing unit comprises:

an absorbing apparatus for absorbing the volatile toxic organic compounds; and regenerating heaters attached on the outer circumference of the absorbing apparatus, and wherein the dust and the volatile toxic organic compounds are removed when the contaminated air containing the dust and the volatile toxic organic compounds passes through the dust collecting unit and the organic compound removing unit.

2. The system as set forth in claim 1, wherein the filtering members of the bag filter are coated with a water-repellant breathable laminated fabric, polyester, or polypropylene.

3. The system as set forth in claim 1, wherein the absorbing apparatus comprises:

a first absorber having activated carbon put therein; and a second absorber having zeolite put therein.

4. The system as set forth in claim 1, wherein the absorbing apparatus comprises
a plurality of absorbing layers,
wherein the absorbing layers made of activated carbon and the absorbing layers made of zeolite are alternately stacked, or the absorbing layers are made of mixtures of the activated carbon and the zeolite.

5. The system as set forth in claim 1, wherein the filtering members of the bag filter are cloth or felt.

6. A system for simultaneously removing dust and volatile toxic organic compounds from contaminated air produced in a workshop, comprising:
a dust collecting unit disposed between an inlet duct and an outlet duct for removing dust;
an organic compound removing unit disposed between the inlet duct and the outlet duct for removing volatile toxic organic compounds; and
an inlet blower disposed between the dust collecting unit and the organic compound removing unit,
wherein the dust collecting unit is made up of a bag filter comprising:
a housing formed in the shape of a box and connected to the inlet duct;
a plurality of filtering members arranged in the housing; and
dust collecting layers defined between the housing and the filtering members,
wherein the organic compound removing unit comprises:
an absorbing apparatus for absorbing the volatile toxic organic compounds; and
regenerating heaters attached on the outer circumference of the absorbing apparatus, and
wherein the system further comprises:
a damper for changing the flow direction of the air to regenerate the absorbing apparatus; and
a water tank connected to a bypass duct for storing the volatile toxic organic compounds, and
whereby wherein the system separately performs
a dust collecting and volatile organic compound removing process in which gas is introduced into the inlet duct, and passes through the bag filter, the absorbing apparatus, the outlet duct, and a discharging unit in order, and
an absorbing apparatus regenerating process in which gas is introduced into the inlet duct, the gas introduced into the inlet duct passes through the bag filter, the gas having passed through the bag filter passed through the absorbing apparatus while the absorbing apparatus is heated by the regenerating heaters attached on the outer circumference of the absorbing apparatus, the gas having passed through the absorbing apparatus passes through the outlet duct, and the damper in order, and is then introduced into the water tank.

7. The system as set forth in claim 6, wherein the filtering members of the bag filter are coated with a water-repellant breathable laminated fabric, polyester, or polypropylene.

8. The system as set forth in claim 6, wherein the absorbing apparatus comprises: a first absorber having activated carbon put therein; and a second absorber having zeolite put therein.

9. The system as set forth in claim 6, wherein the absorbing apparatus comprises
a plurality of absorbing layers,
wherein the absorbing layers made of activated carbon and the absorbing layers made of zeolite are alternately stacked, or the absorbing layers are made of mixtures of the activated carbon and the zeolite.

10. The system as set forth in claim 6, wherein the filtering members of the bag filter are cloth or felt.

* * * * *